Oct. 30, 1956 A. F. APPLEGATE 2,769,128

ELECTRIC MOTOR SYNCHRONIZING APPARATUS

Filed May 20, 1955

INVENTOR.
ALVIN F. APPLEGATE

BY Harry M. Saragovitz

ATTORNEY

United States Patent Office 2,769,128

Patented Oct. 30, 1956

2,769,128

ELECTRIC MOTOR SYNCHRONIZING APPARATUS

Alvin F. Applegate, Sea Girt, N. J., assignor to the United States of America as represented by the Secretary of the Army Application May 20, 1955, Serial No. 510,063

4 Claims. (Cl. 318—314)

(Granted under Title 35, U. S. Code (1952), sec. 266)

The invention described herein may be manufactured and used by or for the Government for governmental purposes without the payment of any royalty thereon.

This invention relates to synchronizing systems wherein it is desired to reproduce in synchronism two interrelated phenomena, the records of which have been previously simultaneously made. The invention is particularly useful where direct physical coupling between the reproducing elements is not desirable or may not be feasible to achieve synchronous operation.

The invention contemplates the system wherein a dual recording operation involving, for example, two types of intelligence may be reproduced in synchronism through the medium of fully automatic electronic control.

In the system which accomplishes the above result two records are recorded on a medium such as a magnetic tape. One of these records may be a sound transcription while the other may be a timing signal representing the recording speed of another operation such as the taking of a motion picture to accompany the sound during a reproducing cycle.

The present invention is concerned chiefly with the synchronous reproduction of the two types of intelligence. To accomplish the reproducing cycle the timing signal is first isolated from the sound record and is used as a pilot control to establish and maintain synchronous timing between the sound and the motion picture. The above control usually involves the regulation of the speed of a motor. In the example to be described herein the controlled motor is the driving motor attached to the motion picture projector.

The invention is directed to an efficient apparatus for using the pilot signal as the basic synchronizing means whereby two recorded events or two types of intelligence occurring at the same time may be reproduced with the same relative timing as that which existed at the time the intelligence was initiated. Exercise of control over the relative timing of the reproducing elements is accomplished through the variation in the power fed to a motor which drives one of the reproducing devices, such as a motion picture projector. Actual control of the motor speed is exercised by variation of an impedance inserted in the power supply line of the motor.

A desirable arrangement for such control is to insert the reactor coil of a saturable reactor in series in the power feed line of the motor, and feed to the direct current coil of the saturable reactor, increments of power which react with the reactor coil to control the motor speed. The controlling increments of power are given a substantially square wave pulse conformation.

The signal which provides the necessary control is derived from a comparison between two pulse trains. The pulses in one of the trains have a positive potential while the other train is composed of negative pulses. The final controlling signal is applied to the primary of the reactor through intermediate devices which may be one or more grid controlled thyratrons or one or more power tubes which develop output power in their plate circuits when the system is out of synchronism.

One of the pulse trains above referred to is created by a commutating device or the like secured to a rotating member connected to a reproducing device such as a motion picture projector. This commutated flow of current produces a pulse train whose frequency corresponds to that of the recorded pilot signal when synchronism is achieved. In the specific device herein described the commutating device and its associated circuitry generates negative pulses which are fed to the power supplying tubes such as thyratrons or power tubes which are suitable for coincident grid operation. The average negative potential of the negative pulses is compared with the average positive potential of the positive pulses. A resulting control signal is thus generated. This controlling signal acts through the tubes and the reactor to maintain synchronous speed of the controlled motor in a manner to be described in detail hereinafter.

It is a primary object of the invention to provide an apparatus for accurately synchronizing the speed of reproduction of at least two events which have previously been simultaneously recorded.

A further object of the invention is to provide a synchronizing apparatus which is automatic and self-stabilizing in operation.

A still further object of the invention is to provide electronic synchronizing apparatus which is capable of exercising instant and positive control over a non-synchronous motor.

A still further object of the invention is to provide a synchronizing apparatus for sound motion picture systems wherein the sound record is made upon a medium independent of the film strip and wherein, during reproduction, no mechanical coupling is required between the projector and the sound reproducing device.

Other objects and features of the invention will more fully appear from the following description and will be particularly pointed out in the claims.

To provide a better understanding of the invention a particular embodiment thereof will be described and illustrated in the accompanying drawing wherein Fig. 1 is a diagrammatic illustration of a preferred form of the invention.

Figure 1:
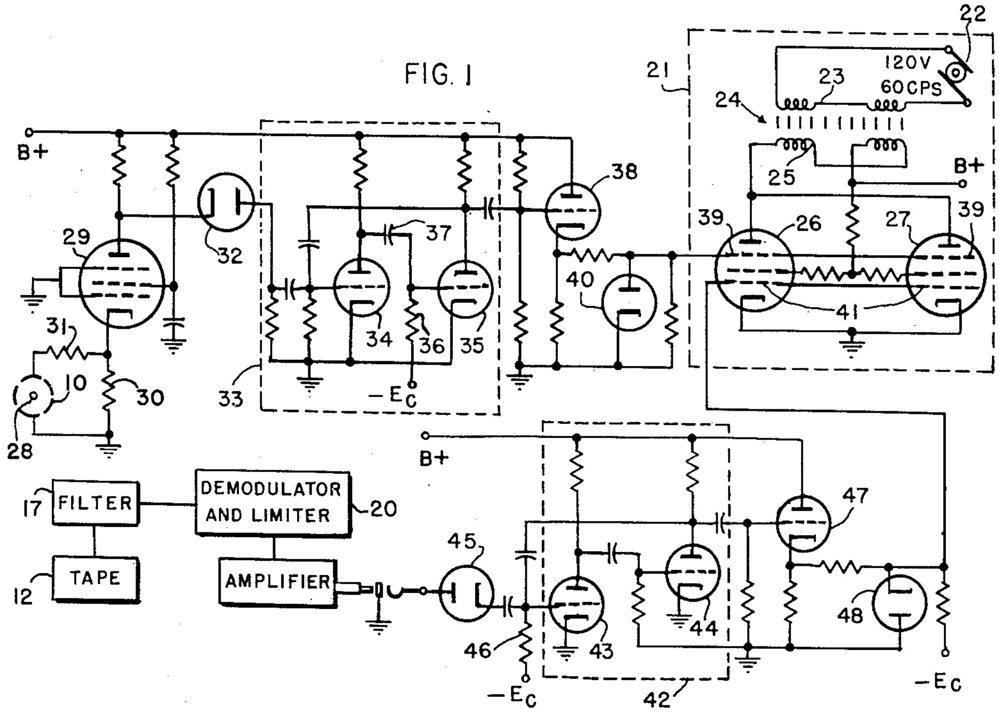

The invention will be described in detail in connection with a sound motion picture system but may equally well be applied to other types of apparatus such as facsimile systems for the transmission of pictures where the rate of scanning and the phase relationship of a modulated input signal must be maintained at the receiving station.

As above stated, basic control of the synchronizing system resides in the initial transcription of two records upon a common medium. One of these records may be the representation of the speed of operation of a device which simultaneously makes a record of an event such as the taking of a motion picture. The record, desirably, takes the form of a series of pulses. The other record simultaneously transcribed on the medium may be the representation of a second event, for example, a transcription of the sound coincident with the action of the motion picture. Since the two records are physically inseparable they supply a reliable means for duplicating the phase relationship of the two phenomena when they are reproduced.

The invention in its application to the motion picture art achieves highly beneficial results not heretofore obtainable. Among other benefits the practice of the invention removes the sound track from the film strip thus avoiding complication in the design of the camera and the projector, and moreover, by removing the sound track from the film strip, film processing difficulties are overcome and additional area on the film strip becomes available for recording the picture. Another important advantage of the invention lies in the improved quality of sound reproduction which is obtained by the use of a magnetic recording medium. The invention also is readily adaptable to standard equipment which is not normally designed for sound reproduction. In view of the above set forth capabilities, the invention will be described in connection with sound motion picture systems although the principles of the invention may be applied to other equipment.

The invention is chiefly concerned with the reproducing cycle of sound motion picture systems and for this reason the following detailed description will be confined mostly to reproducing equipment. A special type of record must, however, first be made. The manner of making the record may follow conventional practice. The record may, desirably, be made in a conventional tape recording machine having its own driving motor for feeding the magnetic tape through the field of the recording head. This recording machine may be used both for recording and for reproduction as will be pointed out hereinafter. The finished record will contain two simultaneous transcriptions, one of which is the sound record and the other will be a record of a pulse train whose frequency is proportional to the frame speed of the camera.

The camera used to take the motion picture is, or may be, of conventional design and has secured to one of its driving shafts a commutator 10. To provide a suitable pulse frequency the commutator may be secured to the shaft of the camera upon which the usual threading knob is secured. In such an arrangement, the commutator may be provided with five segments. Since the threading knob usually has a speed of 24 revolutions per second for normal camera speed a pulse frequency of 120 cycles per second is thus provided.

Figure 2:
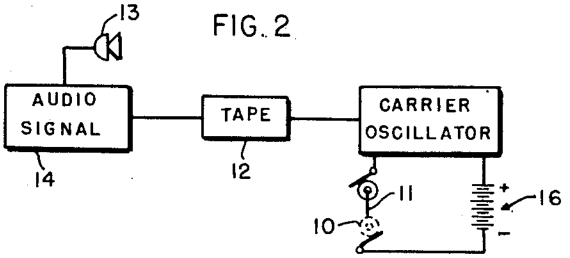
Fig. 2 is a block diagram illustrating the apparatus for transcribing the records which are subsequently used to establish synchronous operation during reproduction.

The commutator 10 is shown diagrammatically in Fig. 2 of the drawing mounted on a shaft 11 of the camera, not shown. The camera may be of any suitable type and may be powered either by a spring motor, an electric motor, or it may be one of a group of synchronized cameras. The recording apparatus shown diagrammatically in Fig. 2 is one example of various systems for obtaining a combined record of the sound coincident to the action of the picture and the timing or pilot signal representing the frame speed of the camera. The records are transcribed upon a conventional magnetic tape 12 which is received in and driven by a conventional tape recording apparatus including electromagnetic recording and reproducing heads, not shown.

A microphone 13 picks up the sound which is amplified in the audio amplifier 14 and recorded on the tape in the usual manner. Simultaneously, the pulses developed by the commutator 10 are recorded on the tape. To provide for subsequent separation of the two signals, it is desirable that the pulses modulate a supersonic carrier frequency. Many commercial tape recording machines include a high frequency oscillator for providing a bias signal used in sound recording. The output of the biasing oscillator may serve in the present instance as a carrier and may be modulated by the current from a battery 16 which is interrupted by the commutator 10. This modulated carrier signal is then fed to the tape together with the sound record. The tape now contains the sound and a pilot timing signal which have a mutually inflexible time relationship.

Figure 3:
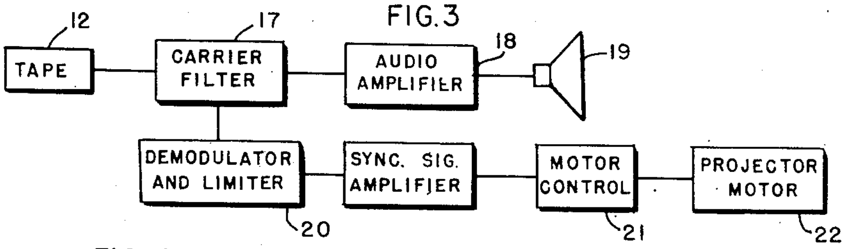
Fig. 3 is a block diagram illustrating the manner in which the records are used in the synchronous control of a motion picture projector motor.

The tape prepared in the above, or any suitable manner, is employed to maintain synchronous timing between the reproduction of the sound and the frame speed of the picture during its projection. The invention provides novel means for accomplishing the above result. In the reproduction cycle the sound record and the pilot signal are first separated, the sound record being used to actuate the loudspeaker, and the pilot signal used to control the speed of the driving motor for the projector. An example of a suitable apparatus for accomplishing the desired result is shown in block diagram in Fig. 3. The tape 12 bearing the previously transcribed records is rewound and run through its reproducing cycle in the tape recording machine. The output of its reproducing head is fed to a filter unit 17 from where the isolated sound signal is fed to an amplifier 18 and thence to a loudspeaker 19. The isolated carrier signal is fed to a demodulator and limiter 20 which converts the carrier to a series of pulses which in turn are fed to an amplifier and from there to a governor or motor controlling device 21. The governor acts to control the power input to the projector motor 22. The motor is of the universal type such as is commonly used in the motion picture industry. Other similar types of motors which are subject to speed control by varying their input power may be used.

The details of the motor controlling means or governor 21 are illustrated in Fig. 1 wherein the projector motor 22 is connected to a 60 cycle power supply line. The power flowing to the motor is controlled by an impedance which, desirably, is the reactor coil 23 of a saturable reactor 24. The impedance of the reactor coil is varied by controlling the current flowing in the direct current coil 25 of the reactor 24.

The flow of current in the direct current coil 25 is under the influence of one or more electron tubes. As shown in Fig. 1, a pair of identical power tubes 26 and 27 are arranged with their elements connected in parallel. The combined output of these tubes is fed to the direct current coil 25.

The tubes 26 and 27 are of suitable construction for operation as coincidence power tubes, that is, the tubes should contain two grids which have substantially equal control over the plate current thereof for a given grid bias. One such tube may be used instead of two. It is, however, desirable to employ the combined outputs of at least two tubes thereby to exercise more rigid control over the current fed to the motor.

Basic control of the plate current in the tubes 26 and 27 is exercised by the interaction of two pulse trains, one originating from the played-back output of the tape 12 and the other from a series of pulses developed by a commutator mounted on the driving shaft of the motion picture projector. The commutator 10 which was used on the camera during the taking of the picture may also be used on the projector provided the commutator is secured to a shaft having the same relative speed with respect to the film frame speed as that of the camera. Other commutator arrangements may be used provided the correct relationship between pulse frequency and frame speed is maintained.

Before the pulses are applied to the tube grids they are amplified and reshaped to insure uniformity and stability in their action upon the tubes. Pulse shaping may be accomplished in any desired manner. As shown herein, the pulse forming and amplifying circuits for both pulse trains are substantially the same and therefore only one of these circuits will be completely described. Referring to Fig. 1, the commutator 10 now secured to a shaft 28 on the motion picture projector rotates at the same speed with respect to the picture frame speed as the shaft 11 on the camera. One of the brushes on the commutator is connected to ground while the other brush is connected to the suppressor grid and cathode of a relatively high gain cut-off pentode 29 through a resistor 30. The cathode of the tube 29 is connected to ground through a biasing resistor 30 having a value operable to bias the tube close to its cutoff point. The connection from the tube cathode to the brush has a resistor 31 therein of substantially lower resistance than the resistor 30. The plate of the tube 29 is supplied with B plus power from a suitable source such as a battery, not shown. The control and suppressor grids of the tube are connected to ground and its screen grid is supplied with a suitable potential from the battery source and is coupled to ground through a suitable capacitor. When the commutator 10 short circuits the brushes during operation of the device, a substantial current will flow in the tube's plate circuit.

For the special requirements of the invention the commutator should preferably contain five segments as above pointed out to obtain a 120 cycles per second frequency at synchronous speed. Furthermore, the segments should be designed to produce a short output pulse in the tube's plate circuit. An example of suitable design for the commutator is to provide segments including about 10° of arc equally spaced along the periphery of the commutator. Such a commutator produces pulses of about 1.15 milliseconds duration.

The trigger pulses from the tube 29 are fed to the cathode of diode 32 the output of which is fed to a pulse forming monostable multivibrator circuit 33 containing triodes 34 and 35. The diode 32 functions to establish the polarity of the pulses and insures that the polarity will be in accordance with a predetermined requirement. In the present instance a negative pulse is desired. The pulse is applied to the grid of the tube 34 through a coupling capacitor. The plate of the tube 34 is coupled to the grid of the tube 35 which in turn is desirably given a strong negative bias of at least minus 50 volts which is applied to the grid of the tube 35 through a resistor 36. The cathodes of the tubes 34 and 35 are grounded. The plate of the tube 34 is energized from the common battery source and has a connection through a capacitor 37 to the grid of the tube 35. The plate of the tube 35 is coupled to the grid of the tube 34 through a suitable capacitor. The values of the elements in the multivibrator are so chosen that a train of pulses of short duration is formed and moreover the inherent characteristics of the multivibrator insures that the width of the pulses is independent of their frequency.

This negative train of pulses is fed to a cathode follower stage including the triode 38. The pulses are applied to the grid of this tube while the output thereof is taken from its cathdode and fed to the grids 39 of the tubes 26 and 27 of the motor control or governing portion of the system previously described. The plate of the tube 38 is connected to the common battery source and its cathode is connected to ground through a suitable resistor.

The output circuit of the tube 38 has connected therein a triode 40 which functions to impart a clamping or stabilizing control upon its output to insure a well formed uniform train of pulses and also this tube functions to trap unwanted increments of power fed back from the motor control circuit.

It will be understood that suitable resistors and capacitors, not described, are incorporated in portions of the circuits which are not described in complete detail.

A second train of pulses is formed in a second pulse forming circuit and this pulse train is applied to a second grid 41 on each of the tubes 26 and 27. In this pulse forming circuit a tube such as the tube 29 employed in the above described pulse forming circuit is omitted although such a tube may be used if desired. The pulses in the present circuit are played back from the timing signal on the tape 12 in the manner previously described and illustrated in block diagram in Fig. 1. The pulses thus derived from the tape are considered to be in suitable form to be applied directly to a pulse shaping multivibrator 42 including the triodes 43 and 44. Desirably, however, before passing to the multivibrator the polarity of the pulses is determined by connection to a diode 45 in such a manner that a positive trigger pulse will be applied to the grid of the tube 43. The circuit elements in this multivibrator are similar to those in the multivibrator 33 and function in a manner similar thereto. A circuit variation in the multivibrator 42 consists in the application of minus 50 volts of bias to the grid of the tube 43 through a resistor 46 the tube 43 being the first tube in the multivibrator as compared to the application of the grid bias to the second tube in the multivibrator 33. In the circuit 42 as in the circuit 33 its output is fed to the cathode follower stage 47 and thence to a diode 48 so connected that an accurate positive pulse train is passed to the grids 41 of the tubes 26 and 27.

The pulse forming circuits are designed to produce narrow pulses of substantial amplitude and uniform width which remain unchanged when the frequency of the pulse train changes. The action of the multivibrators insure that the pulses remain uniform in size. Therefore, when the two pulse trains are compared in the motor control circuit a difference in frequency between the two trains will produce a substantial average difference in potential to effectively control the motor 22.

The operation of the apparatus is as follows. The values of the circuit elements in the governing portion of the apparatus are so chosen that when the device is inoperative the tubes are biased sufficiently negative to insure that their potential is somewhat above the cutoff value for the tubes 26 and 27. Desirably, also, at zero potential of the grids 39 and 41, the plate current will be such that the impedance of the reactor coil 23 of the reactor will assume a normal value for operation of the motor 22 at synchronous speed with normal line voltage applied to its terminals through the series-connected reactor coil 23.

Before starting the system the tape containing the sound and pilot signal must be adjusted in the reproducing mechanism to a position which has a predetermined relation to a fixed starting point somewhere on the apparatus, the position of the starting point being established at the time the record was made. In addition, a starting reference point on the film strip must also be adjusted to a reference point upon the projector. The two starting positions must be so chosen that the sound and picture will initially be reproduced in correct time relationship. The power is then simultaneously switched on to the tape recorder and the motor 22. The tape recorder motor operates under a very light load and almost immediately attains its running speed. The sound and pilot signals are thus reproduced almost immediately at their normal rate. The pilot signal being reproduced at its normal frequency acts to impress positive pulses upon the grids 41 of the tubes 26 and 27. The immediate result at this time is to cause the tubes to conduct a substantial volume of current. It should be noted that at this instant the motor 22 which bears the load imposed by the projector has not started or may be running at very low speed and therefore produces substantially no negative pulses through its commutator 10. As a result the grids 39 do not substantially influence the grids 41 and therefore the grids 41 assume control of the plate current.

The flow of current in the plate circuits of the tubes 26 and 27 and in the D. C. winding of the reactor reduces the impedance of the reactor coil 23 thereof, thus causing maximum current to be delivered to the motor 22 greatly increasing its torque above a normal level which rapidly accelerates the motor to its normal speed. As the motor accelerates, the frequency of negative pulses from the commutator 10 increases. This increase in negative pulse applied to the grids 39 tends to neutralize the average positive potential on the grids 41 with a consequent reduction in plate current which in turn is reflected in the reactor coil 23 of the reactor by an increase in its impedance thus reducing the flow of current to the motor. When the frequency of both pulse trains is equal, the reactor coil 23 assumes its normal impedance and the motor runs at synchronous speed.

The cycle above described takes place rapidly, its total elapsed time being greatly reduced by the accelerating effect of the reduced impedance in the reactor coil 23 of the reactor. This acceleration period is short and may be accurately determined. Knowing the length of the accelerating cycle, allowances are made in the starting point of the film strip so that when synchronous operation is attained the sound and picture will have correct initial timing relationship.

Figure 4:
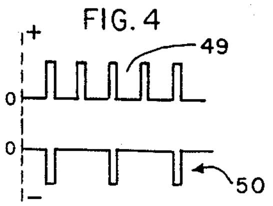
Fig. 4 is a graphical representation of the two pulse trains which act together to exercise synchronizing control over the projector motor.

Fig. 4 of the drawings illustrates diagrammatically the relationship of the positive and negative pulse trains during out-of-phase periods, such, for example, as during the acceleration of the motor 22. The positive pulse train 49 represents the pulses derived from the magnetic tape 12 the frequency of which is shown as that of the operating frequency of the system. The pulse train 50 represents negative pulses which are originated by the commutator 10 and have a frequency less than that of the positive pulse train thus the effective average potentials of the positive pulses at the instant illustrated is greater than the effective average of the negative pulses. Thus the resulting substantial positive grid control voltage is effective in the tubes 26 and 27 to cause them to conduct as above described.

When conditions at the motor change, tending to cause it to run faster than synchronous speed, more negative pulses are created in a given time period than positive pulses, thus an effective negative potential acts within the tubes thereby reducing the plate current and increasing the impedance of the reactor coil 24 which cuts down the motor speed. Thus the automatic shift in the effective bias on the tubes 26 and 27, established by the coincidence grids 39 and 41, controls the power fed to the motor and consequently the speed of the motor in accordance with the frequency of the pilot signal. In this manner the speed of the motion picture projector is maintained in synchronism with the reproduction of the sound signal which is amplified in the amplifier 18 and reproduced in the loudspeaker 19. It is obvious also that if the motor subsquently slows down, its speed will be corrected in the manner described in connection with the starting cycle above set forth.

What is claimed is:

1. A synchronizing system comprising, a motor to be governed, a saturable reactor having its reactor coil connected in series with the power supply to said motor, at least one grid controlled electronic tube having its output connected to the direct current coil of said saturable reactor, a magnetic recording medium having transcribed thereon an intelligence record and a timing record, means for reproducing the records from said magnetic tape, means for separating the records, means for recreating the intelligence from its record, pulse forming means for forming an amplified chain of unipolar pulses from said timing record, a connection from the output of said pulse forming means to the grid of said tube, a second pulse forming means for forming a pulse train having a polarity opposite to that of said other pulse train and a frequency proportional to the speed of said motor, a connection from the second pulse forming means to the grid of the tube whereby a plate current controlling grid bias is applied to the tube which represents the difference in the average potentials of the two pulse trains.

2. A synchronizing system comprising a nonsynchronous motor to be controlled, a saturable reactor having its reactor coil connected in series in the power supply to said motor, at least one multiple grid electronic power tube having its output connected to the direct current coil of said saturable reactor, a magnetic recording medium having transcribed thereon an intelligence record and a timing record, means for reproducing and separating said two records, means for recreating the intelligence from the record, means for forming a first amplified unipolar chain of pulses from said timing record, a connection from the output of said pulse former to one of the grids of said tube, means for forming a second pulse train having a polarity opposite to that of said first pulse train and having a frequency proportional to the speed of said motor, a connection from the output of said second pulse forming means to a second grid in said tube, whereby an effective grid bias is applied to the tube representing the difference in the average potentials of the two pulse trains.

3. A synchronizing system comprising a nonsynchronous motor, a saturable reactor having its reactor coil connected in series in the power supply to the motor, at least one multiple grid electronic tube having its output connected to the direct current coil of said saturable reactor, a magnetic recording medium having transcribed thereon an intelligence record and a timing record, means for reproducing said records, means for separating the records, means for recreating the intelligence from its record, means for forming a first amplified unipolar chain of pulses from said timing record, a connection from the output of said pulse former to one of the grids of said tube, an electric current interrupting means mechanically connected to said motor acting to produce a second pulse train having a frequency proportional to the motor speed, means to convert said second pulse train to unidirectional pulses of opposite polarity to that of the first pulse train, means to conduct said second pulse train to a second grid in said tube whereby an effective grid bias is applied to the tube representing the difference in the average potentials of the two pulse trains.

4. A system for synchronizing the reproduction of two interrelated intelligence records during their reproduction, comprising a recording and reproducing device including a magnetic recording tape having transcribed thereon one of said intelligence records and a timing record representing the speed of transcription of the other intelligence record, a nonsynchronous alternating current motor to be controlled, a saturable reactor having its reactor coil connected in series in the power line to said motor, at least one electronic tube having at least two control grids, said tube having its output connected to the direct current coil of said saturable reactor, means on said recording and reproducing device for reproducing the records, means for separating the records, means for forming a first amplified unipolar chain of pulses from said timing record, a connection from the output of said pulse former to one of said grids, means for forming a second pulse train having a polarity opposite to that of said first pulse train and having a frequency proportional to the speed of said motor, a connection from the output of said second pulse former to a second grid in said tube whereby an effective grid bias is applied to the tube representing the difference in the average potentials of the two pulse trains.

References Cited in the file of this patent

UNITED STATES PATENTS

| | | |
|---|---|---|
| 2,403,921 | Hallborg | July 16, 1946 |
| 2,496,103 | Neufeld | Jan. 31, 1950 |
| 2,601,516 | Gray | June 24, 1952 |